US012665523B2

(12) United States Patent
Vu

(10) Patent No.: US 12,665,523 B2
(45) Date of Patent: Jun. 23, 2026

(54) POWER CONVERSION SYSTEM WITH CONNECTION CIRCUITRY AND REPLACEABLE BUSBAR SET

(71) Applicant: Lite-On Technology Corporation, Taipei (TW)

(72) Inventor: Lam Vu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 205 days.

(21) Appl. No.: 18/664,297

(22) Filed: May 15, 2024

(65) Prior Publication Data

US 2025/0175091 A1      May 29, 2025

Related U.S. Application Data

(60) Provisional application No. 63/603,105, filed on Nov. 27, 2023.

(51) Int. Cl.
| | |
|---|---|
| *H02M 7/00* | (2006.01) |
| *H02M 1/00* | (2006.01) |
| *H02M 3/00* | (2006.01) |
| *H02M 3/10* | (2006.01) |
| *H02M 7/12* | (2006.01) |

(52) U.S. Cl.
CPC ........... *H02M 7/003* (2013.01); *H02M 1/007* (2021.05); *H02M 3/003* (2021.05); *H02M 3/10* (2013.01); *H02M 7/12* (2013.01)

(58) Field of Classification Search
CPC ...... H02M 7/003; H02M 1/007; H02M 3/003; H02M 3/10; H02M 7/12
See application file for complete search history.

(56) References Cited

U.S. PATENT DOCUMENTS

2024/0048063 A1* 2/2024 Bryant ................ H02M 1/0095

* cited by examiner

*Primary Examiner* — Rafael O De Leon Domenech
(74) *Attorney, Agent, or Firm* — JCIPRNET

(57) ABSTRACT
A power conversion system includes a connection circuitry and a plurality of power conversion groups. The connection circuitry includes a plurality of input terminals, a plurality of output terminals and a busbar set that selectively connects the plurality of input terminals to the plurality of output terminals. The plurality of input terminals may receive an input voltage; the plurality of output terminals may output a plurality of voltages; and the busbar set is replaceable and is selected according to a type of the input voltage. The plurality of power conversion groups are connected to the plurality of output terminals and are configured to convert the voltages at the plurality of output terminals to generate an output voltage. Each power conversion group includes a plurality of power converters connected in parallel.

17 Claims, 5 Drawing Sheets

POWER CONVERSION SYSTEM WITH CONNECTION CIRCUITRY AND REPLACEABLE BUSBAR SET

CROSS-REFERENCE TO RELATED APPLICATION

This application claims the priority benefit of U.S. provisional application Ser. No. 63/603,105, filed on Nov. 27, 2023. The entirety of the above-mentioned patent application is hereby incorporated by reference herein and made a part of this specification.

BACKGROUND

Technical Field

The disclosure relates to a power conversion system, and more particularly to a power conversion system having a connection circuitry with replaceable busbar sets for supporting various types of an input voltage.

Description of Related Art

A power conversion system is widely used in many electronic devices to convert an input voltage to an output voltage. A type of the input voltage may vary depending on the specification and design of the electronic devices. For instance, the input voltage of the electronic devices may be a single-phase alternating-current (AC) voltage, a three-phase AC voltage, a direct-current (DC) voltage, or another type of the input voltage. A conventional power conversion system supports only a certain type of input voltage. Therefore, a power conversion system that is designed to work with the DC input voltage does not work with the single-phase AC input voltage or the three-phase AC input voltage, and vice versa. As a result, an application of the conventional power conversion system is limited.

It is desirable for a creative design of a power conversion system that can support flexibly various types of the input voltage.

SUMMARY

The disclosure introduces a power conversion system with replaceable busbar sets for supporting various types of an input voltage.

In some embodiments, the power conversion system includes a connection circuitry and a plurality of power conversion groups. The connection circuitry includes a plurality of input terminals, a plurality of output terminals and a busbar set that selectively connects the plurality of input terminals to the plurality of output terminals. The plurality of input terminals may receive an input voltage; the plurality of output terminals may output a plurality of voltages; and the busbar set is replaceable and is selected according to a type of the input voltage. The plurality of power conversion groups are connected to the plurality of output terminals and are configured to convert the voltages at the plurality of output terminals to generate an output voltage. Each power conversion group includes a plurality of power converters connected in parallel.

In some embodiments, the busbar set in the connection circuitry may be replaceable depending on the type of the input voltage. For example, a busbar set is selected when the input voltage is a three-phase AC voltage, and another busbar set is selected when the input voltage is a single-phase AC voltage. In this way, the power conversion system having the connection circuitry with replaceable busbar set may support flexibly various types of input voltage.

DESCRIPTION OF THE EMBODIMENTS

Figure 1:
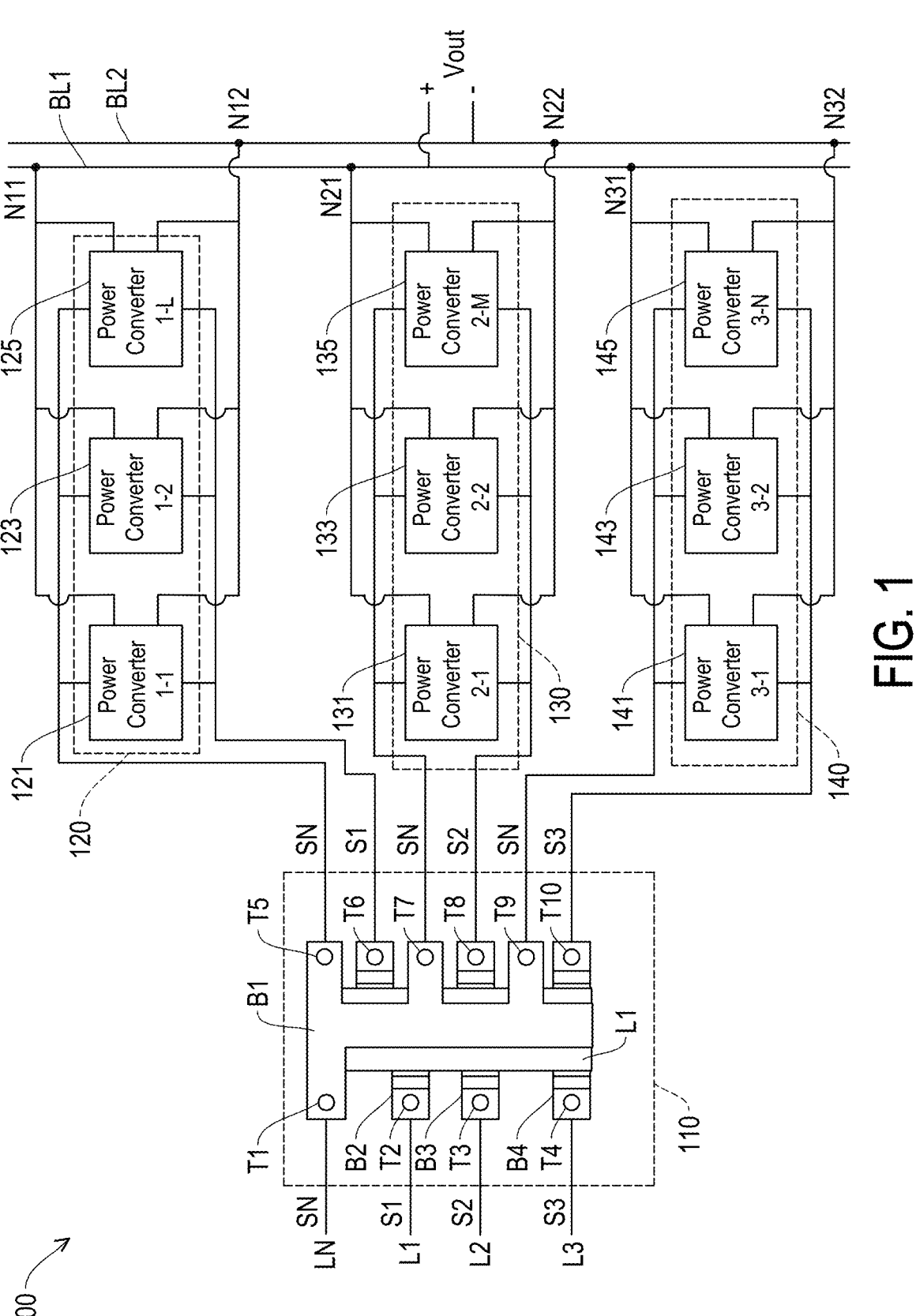
FIG. 1 is a schematic diagram of a power conversion system that supports a three-phase input voltage in a Wye configuration in accordance with some embodiments.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a schematic diagram of a power conversion system 100 that supports a three-phase input voltage in a Wye configuration in accordance with some embodiments. The power conversion system 100 may receive the three-phase AC voltage as an input voltage and may output a DC voltage Vout as an output voltage. The three-phase AC voltage may be formed by a neutral signal SN, a first phase signal S1, a second phase signal S2 and a third phase signal S3.

The power conversion system 100 may include a connection circuitry 110 and a plurality of power conversion groups 120, 130 and 140, in which the connection circuitry 110 includes a plurality of terminals T1 to T10 and a first busbar set. The terminals T1 to T4 of the connection circuitry 110 are considered as input terminals of the connection circuitry 110, and the terminals T5 to T10 of the connection circuitry 110 are considered as output terminals of the connection circuitry 110. The terminals T1 to T4 are electrically connected to a neutral line LN and phase lines L1, L2 and L3 to receive the neutral signal SN, the first phase signal S1, the second phase signal S2 and the third phase signal S3 respectively. Particularly, the neutral line LN is electrically connected to the first terminal T1 of the connection circuitry 110 to supply the neutral signal SN of the three-phase AC voltage to the connection circuitry 110. The phase lines L1, L2 and L3 are electrically connected to a second terminal T2, a third terminal T3 and a fourth terminal T4 of the connection circuitry 110 to supply the first phase signal S1, the second phase signal S2 and the third phase signal S3 of the three-phase AC voltage to the connection circuitry 110. The terminals T5 to T10 are electrically connected to the power conversion groups 120, 130 and 140, and the connection circuitry 110 is configured to output voltages to the power conversion groups 120, 130 and 140 via the terminals T5 to T10.

The first busbar set of the connection circuitry 110 may include an insulating layer L1, and busbars B1, B2, B3 and B4. The insulating layer L1 is made of insulating material that does not conduct electricity. The busbars B1, B2, B3 and B4 are made of conductive material (i.e., metals) and are disposed on the insulating layer L1. The disclosure does not intend to limit the material of the insulating layer L1, the material of the busbars B1, B2, B3 and B4, and an arrangement of the insulating layer L1 and the busbars B1, B2, B3 and B4.

The busbar B1 is configured to electrically connect the first terminal T1 of the connection circuitry 110 to the fifth terminal T5, the seventh terminal T7 and the ninth terminal T9 of the connection circuitry 110. The busbar B2 is configured to electrically connect the second terminal T2 of the connection circuitry 110 to the sixth terminal T6 of the connection circuitry 110. The busbar B3 is configured to electrically connect the third terminal T3 of the connection circuitry 110 to the eighth terminal T8 of the connection circuitry 110. The busbar B4 is configured to electrically connect the fourth terminal T4 of the connection circuitry 110 to the tenth terminal T10 of the connection circuitry 110. As a result, the neutral signal SN is output to the fifth terminal T5, the seventh terminal T7 and the ninth terminal T9 of the connection circuitry 110; the first phase signal S1 is output to the sixth terminal T6 of the connection circuitry 110; the second phase signal S2 is output to the eighth terminal T8 of the connection circuitry 110; and the third phase signal S3 is output to the tenth terminal T10 of the connection circuitry 110.

The power conversion groups 120, 130 and 140 of the power conversion system 100 are electrically connected between the connection circuitry 110 and buses BL1 and BL2. Each of the power conversion groups 120, 130 and 140 may include a plurality of power converters connected in parallel. More specifically, the power conversion group 120 includes power converters 121, 123 and 125 connected in parallel; the power conversion group 130 includes power converters 131, 133 and 135 connected in parallel; and the power conversion group 140 includes power converters 141, 143 and 145 connected in parallel. The power conversion groups 120, 130 and 140 are configured to receive voltages at the output terminals T5 to T10 of the connection circuitry 110, convert the received voltages to generate output voltage, and output the output voltage to the buses BL1 and BL2.

In some embodiments, each of the power converters 121, 123 and 125 of the power conversion group 120 receives a voltage which is a potential difference between the neutral signal SN at the fifth terminal T5 and the first phase signal S1 at the sixth terminal T6 of the connection circuitry 110. The power converters 121, 123 and 125 may convert the received voltage to generate an output voltage and provide the generated output voltage to the buses BL1 and BL2 via connection nodes N11 and N12. Each of the power converters 131, 133 and 135 of the power conversion group 130 may receive a voltage which is a potential difference between the neutral signal SN at the seventh terminal T7 and the second phase signal S2 at the eighth terminal T8 of the connection circuitry 110. The power converters 131, 133 and 135 may convert the received voltage to generate an output voltage, and provide the generated output voltage to the buses BL1 and BL2 via connection nodes N21 and N22. Each of the power converters 141, 143 and 145 of the power conversion group 140 may receive a voltage which is a potential difference between the neutral signal SN at the ninth terminal T9 and the third phase signal S3 at the tenth terminal T10 of the connection circuitry 110. The power converters 141, 143 and 145 may convert the received voltage to generate an output voltage, and provide the generated output voltage to the buses BL1 and BL2 via connection nodes N31 and N32. In some embodiments, the power converters in the power conversion groups 120, 130 and 140 are AC-to-DC converters, rectifiers, or a combination thereof. In this way, the power conversion system 100 may support the three-phase AC input voltage in the Wye configuration.

Figure 2:
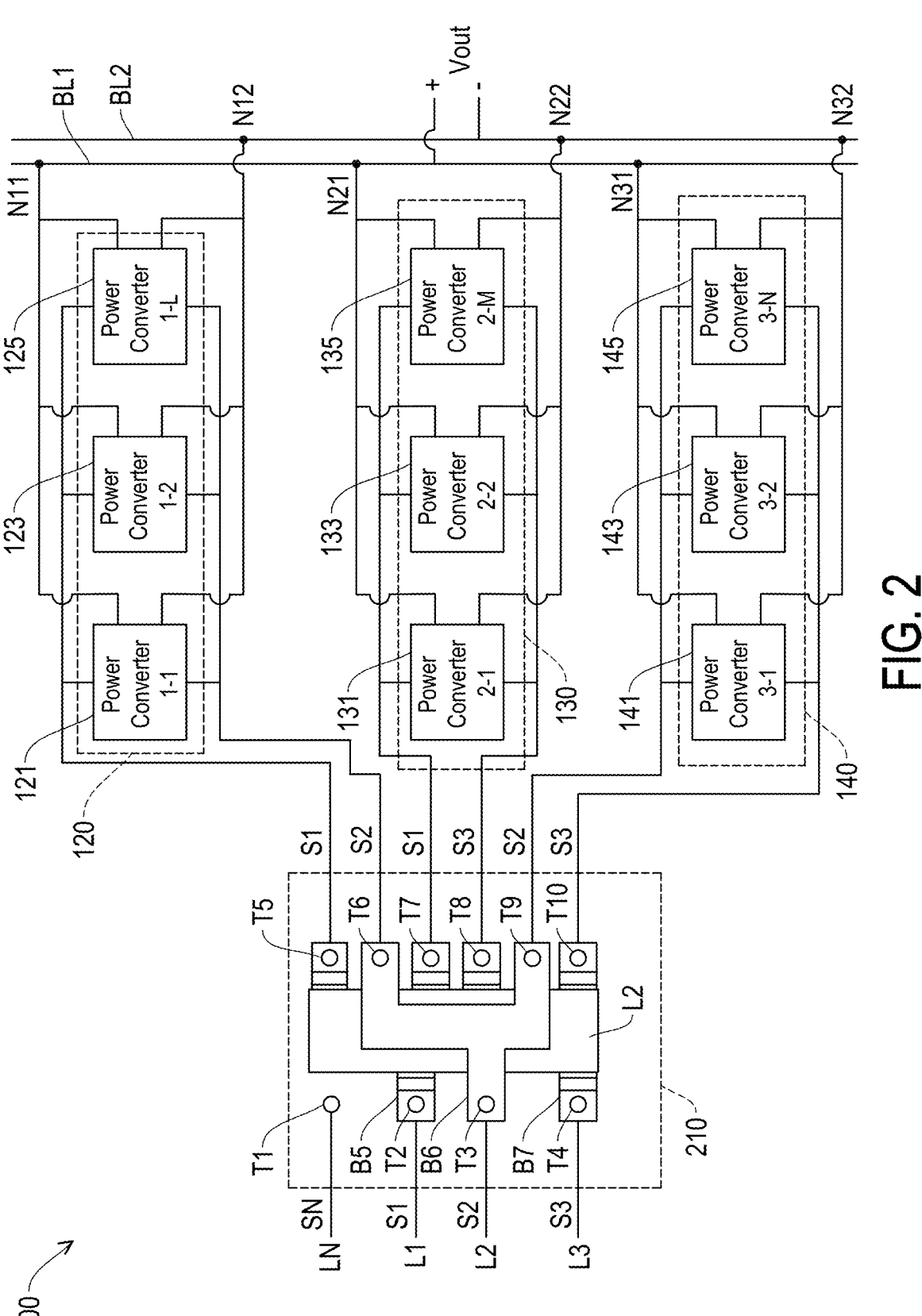
FIG. 2 is a schematic diagram a power conversion system that supports a three-phase input voltage in a Delta configuration in in accordance with some embodiments.

FIG. 2 illustrates a schematic diagram of a power conversion system 200 that supports a three-phase input voltage in a Delta configuration in accordance with some embodiments. The power conversion system 200 may receive the three-phase AC voltage as an input voltage and may output a DC voltage Vout as an output voltage. The three-phase AC voltage may be formed by a neutral signal SN, a first phase signal S1, a second phase signal S2 and a third phase signal S3.

The power conversion system 200 may include a connection circuitry 210 and a plurality of power conversion groups 120, 130 and 140. The power conversion groups 120, 130 and 140 of the power conversion system 200 in FIG. 2 are essentially the same as the power conversion groups 120, 130 and 140 of the power conversion system 100 in FIG. 1, and the terminals T1 to T10 of the connection circuitry 210 in FIG. 2 are essentially the same as the terminals T1 to T10 of the connection circuitry 110 in FIG. 1. Thus, the detailed description of the power conversion groups 120, 130 and 140 and the terminals T1 to T10 of the connection circuitry 210 of the power conversion system 200 is omitted hereafter.

The connection circuitry 210 may comprise a second busbar set that includes an insulating layer L2, and busbars B5, B6 and B7. The insulating layer L2 is made of insulating material that does not conduct electricity. The busbars B5, B6 and B7 are made of conductive material (i.e., metals) and are disposed on the insulating layer L2. The disclosure does not intend to limit the material of the insulating layer L2, the material of the busbars B5, B6 and B7, and an arrangement of the insulating layer L2 and the busbars B5, B6 and B7.

The busbar B5 is configured to electrically connect the second terminal T2 of the connection circuitry 210 to the fifth terminal T5 and the seventh terminal T7 of the connection circuitry 210. The busbar B6 is configured to electrically connect the third terminal T3 of the connection circuitry 210 to the sixth terminal T6 and the ninth terminal T9 of the connection circuitry 210. The busbar B7 is configured to electrically connect the fourth terminal T4 of the connection circuitry 210 to the eighth terminal T8 and the tenth terminal T10 of the connection circuitry 210. The first terminal T1 of the connection circuitry 210 is not electrically connected to any of the terminals T5 to T10 of the connection circuitry 210. In other words, the neutral signal SN in the neutral line LN is not supplied to the power conversion groups 120, 130 and 140. In an embodiment of the disclosure, the first terminal T1 of the connection circuitry 210 may be connected to the neutral line LN. In another embodiment of the disclosure, the first terminal T1 of the connection circuitry 210 may not be connected to the neutral line LN. The first phase signal S1 is output to the fifth terminal T5 and the seventh terminal T7 of the connection circuitry 210 via the busbar B5; the second phase signal S2 is output to sixth terminal T6 and the ninth terminal T9 of the connection circuitry 210 via the busbar B6; and the third phase signal S3 is output to the eighth terminal T8 and the tenth terminal T10 of the connection circuitry 210 via the busbar B7.

Each of the power converters 121, 123 and 125 of the power conversion group 120 receives a voltage which is a potential difference between the first phase signal S1 at the fifth terminal T5 and the second phase signal S2 at the sixth terminal T6 of the connection circuitry 210. The power converters 121, 123 and 125 may convert the received voltage to generate an output voltage and provide the generated output voltage to the buses BL1 and BL2 via connection nodes N11 and N12. Each of the power converters 131, 133 and 135 of the power conversion group 130 may receive a voltage which is a potential difference between the first phase signal S1 at the seventh terminal T7 and the third phase signal S3 at the eighth terminal T8 of the connection circuitry 210. The power converters 131, 133 and 135 may convert the received voltage to generate an output voltage, and provide the generated output voltage to the buses BL1 and BL2 via connection nodes N21 and N22. Each of the power converters 141, 143 and 145 of the power conversion group 140 receives a voltage which is a potential difference between the second phase signal S2 at the ninth terminal T9 and the third phase signal S3 at the tenth terminal T10 of the connection circuitry 210. The power converters 141, 143 and 145 may convert the received voltage to generate an output voltage, and provide the generated output voltage to the buses BL1 and BL2 via connection nodes N31 and N32. In this way, the power conversion system 200 may support the three-phase AC input voltage in the Delta configuration.

Figure 3:
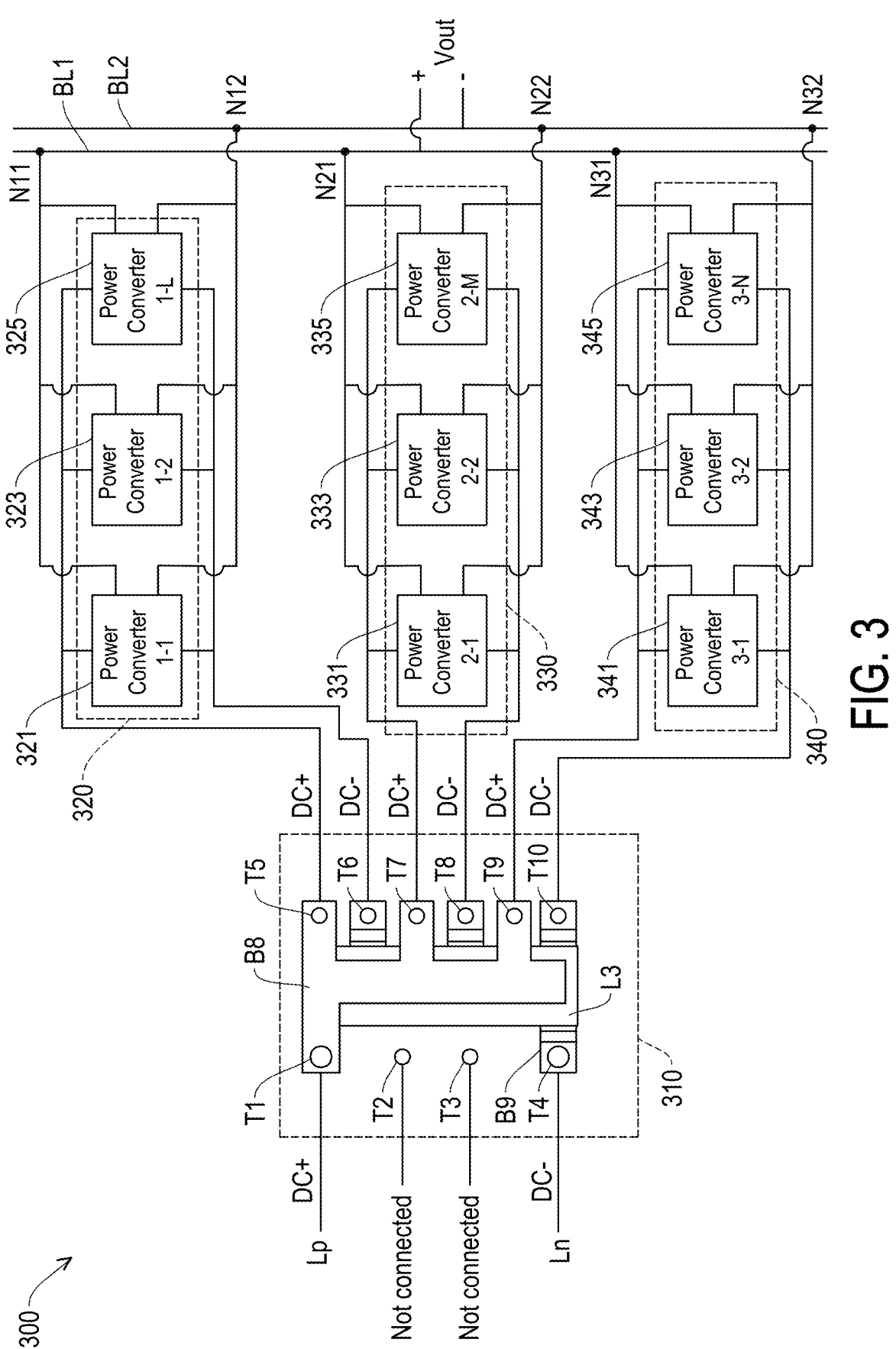
FIG. 3 is a schematic diagram of a power conversion system that supports a DC input voltage in accordance with some embodiments.

FIG. 3 illustrates a schematic diagram of a power conversion system 300 that supports a DC input voltage in accordance with some embodiments. The power conversion system 300 may receive a DC voltage as an input voltage and may output a DC voltage Vout as an output voltage. The DC input voltage refers to a potential difference between a potential DC+ at a line Lp and a potential DC− at a line Ln. The potential DC+ may have a positive voltage level, and the potential DC− may have a ground voltage level or a negative voltage level.

The power conversion system 300 may include a connection circuitry 310 and a plurality of power conversion groups 320, 330 and 340. The terminals T1 to T10 of the connection circuitry 310 in FIG. 3 are essentially the same as the terminals T1 to T10 of the connection circuitry 110 in FIG. 1, thus detailed description of the terminals T1 to T10 of the connection circuitry 310 are omitted hereafter.

The connection circuitry 310 may comprise a third busbar set that includes an insulating layer L3, and busbars B8 and B9. The insulating layer L3 is made of insulating material that does not conduct electricity. The busbars B8 and B9 are made of conductive material (i.e., metals) and are disposed on the insulating layer L3. The disclosure does not intend to limit the material of the insulating layer L3, the material of the busbars B8 and B9, and an arrangement of the insulating layer L3 and the busbars B8 and B9.

The busbar B8 is configured to electrically connect the first terminal T1 of the connection circuitry 310 to the fifth terminal T5, the seventh terminal T7 and the ninth terminal T9 of the connection circuitry 310. The busbar B9 is configured to electrically connect the fourth terminal T4 of the connection circuitry 310 to the sixth terminal T6, the eighth terminal T8 and the tenth terminal T10 of the connection circuitry 310. The potential DC+ is supplied to the fifth terminal T5, the seventh terminal T7 and the ninth terminal T9 of the connection circuitry 310 via the busbar B8. The potential DC− is supplied to the sixth terminal T6, the eighth terminal T8 and the tenth terminal T10 of the connection circuitry 310 via the busbar B9. The second terminal T2 and the third terminal T3 of the connection circuitry 310 are not electrically connected to any of the terminals T5 to T10 of the connection circuitry 310. Furthermore, the second terminal T2 and the third terminal T3 of the connection circuitry 310 may not be supplied with any voltage.

Each of the power converters 321, 323 and 325 of the power conversion group 320 may receive a voltage which is a potential difference between the potential DC+ at the fifth terminal T5 and the potential DC− at the sixth terminal T6 of the connection circuitry 310. The power converters 321, 323 and 325 may convert the received voltage to generate an output voltage and provide the generated output voltage to the buses BL1 and BL2 via connection nodes N11 and N12. Each of the power converters 331, 333 and 335 of the power conversion group 330 may receive a voltage which is a potential difference between the potential DC+ at the seventh terminal T7 and the potential DC− at the eighth terminal T8 of the connection circuitry 310. The power converters 331, 333 and 335 may convert the received voltage to generate an output voltage, and provide the generated output voltage to the buses BL1 and BL2 via connection nodes N21 and N22. Each of the power converters 341, 343 and 345 of the power conversion group 340 may receive a voltage which is a potential difference between the potential DC+ at the ninth terminal T9 and the potential DC− at the tenth terminal T10 of the connection circuitry 310. The power converters 341, 343 and 345 may convert the received voltage to generate an output voltage, and provide the generated output voltage to the buses BL1 and BL2 via connection nodes N31 and N32. In some embodiments, the power converters in the power conversion groups 320, 330 and 340 are DC-to-DC converters. In this way, the power conversion system 300 may support the DC input voltage.

Figure 4:
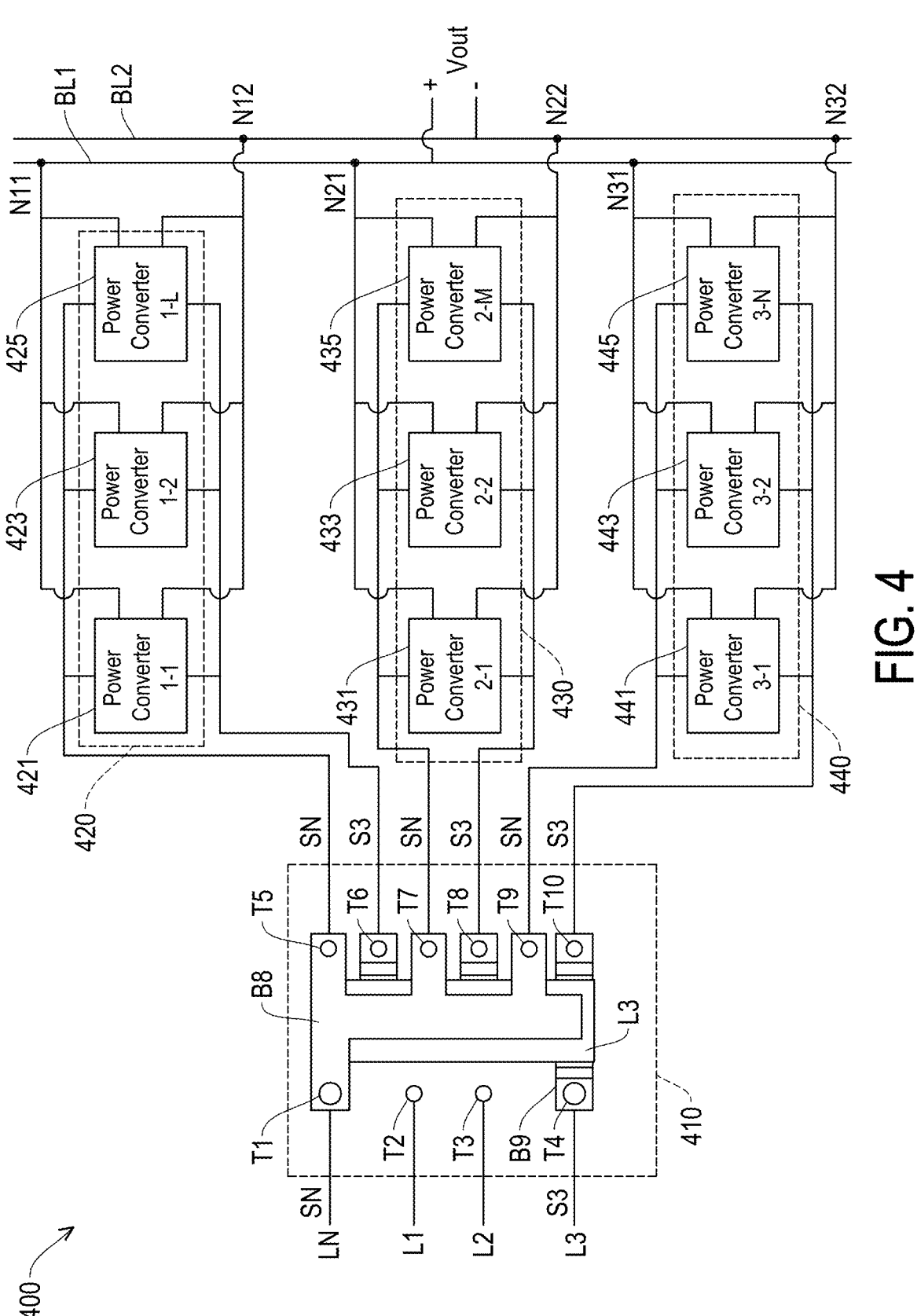
FIG. 4 is a schematic diagram of a power conversion system that supports a single-phase AC input voltage in accordance with some embodiments.

FIG. 4 is a schematic diagram of a power conversion system 400 that supports a single-phase AC input voltage in accordance with some embodiments. The power conversion system 400 may receive a single-phase AC voltage as an input voltage and may output a DC voltage Vout as an output voltage. The single-phase AC voltage is formed by the neutral signal SN being supplied from a neutral line LN and a phase signal. For example, the single-phase AC voltage is formed by the neutral signal SN being supplied from a neutral line LN and the third phase signal S3 being supplied from a phase line L3.

The power conversion system 400 may include a connection circuitry 410 and a plurality of power conversion groups 420, 430 and 440. The connection circuitry 410 of the power conversion system 400 in FIG. 4 are essentially the same as the connection circuitry 310 of the power conversion system 300 in FIG. 3, except for the input voltage that is supplied to the connection circuitry 410. In FIG. 4, the first terminal T1 of the connection circuitry 410 is supplied with the neutral signal SN, and the fourth terminal T4 of the connection circuitry 410 is supplied with the third phase signal S3. In other words, the neutral signal SN is supplied to the fifth terminal T5, the seventh terminal T7 and the ninth terminal T9 of the connection circuitry 410 via the busbar B8. The third phase signal S3 is supplied to the sixth terminal T6, the eighth terminal T8 and the tenth terminal T10 of the connection circuitry 410 via the busbar B9. The second terminal T2 and the third terminal T3 of the connection circuitry 410 are not electrically connected to any of the terminals T5 to T10 of the connection circuitry 410. The second terminal T2 and the third terminal T3 of the connection circuitry 410 are not supplied with any voltage.

Each of the power converters 421, 423 and 425 of the power conversion group 420 may receive a voltage which is a potential difference between the neutral signal SN at the fifth terminal T5 and the third phase signal S3 at the sixth terminal T6 of the connection circuitry 410. The power converters 421, 423 and 425 may convert the received voltage to generate an output voltage and provide the generated output voltage to the buses BL1 and BL2 via connection nodes N11 and N12. Each of the power converters 431, 433 and 435 of the power conversion group 430 may receive a voltage which is a potential difference between the neutral signal SN at the seventh terminal T7 and the third phase signal S3 at the eighth terminal T8 of the connection circuitry 410. The power converters 431, 433 and 435 may convert the received voltage to generate an output voltage, and provide the generated output voltage to the buses BL1 and BL2 via connection nodes N21 and N22. Each of the power converters 441, 443 and 445 of the power conversion group 440 may receive a voltage which is a potential difference between the neutral signal SN at the ninth terminal T9 and the third phase signal S3 at the tenth terminal T10 of the connection circuitry 410. The power converters 441, 443 and 445 may convert the received voltage to generate an output voltage, and provide the generated output voltage to the buses BL1 and BL2 via connection nodes N31 and N32. In some embodiments, the power converters in the power conversion groups 420, 430 and 440 are AC-to-DC converters. In this way, the power conversion system 400 may support the single-phase AC input voltage.

Figure 5:
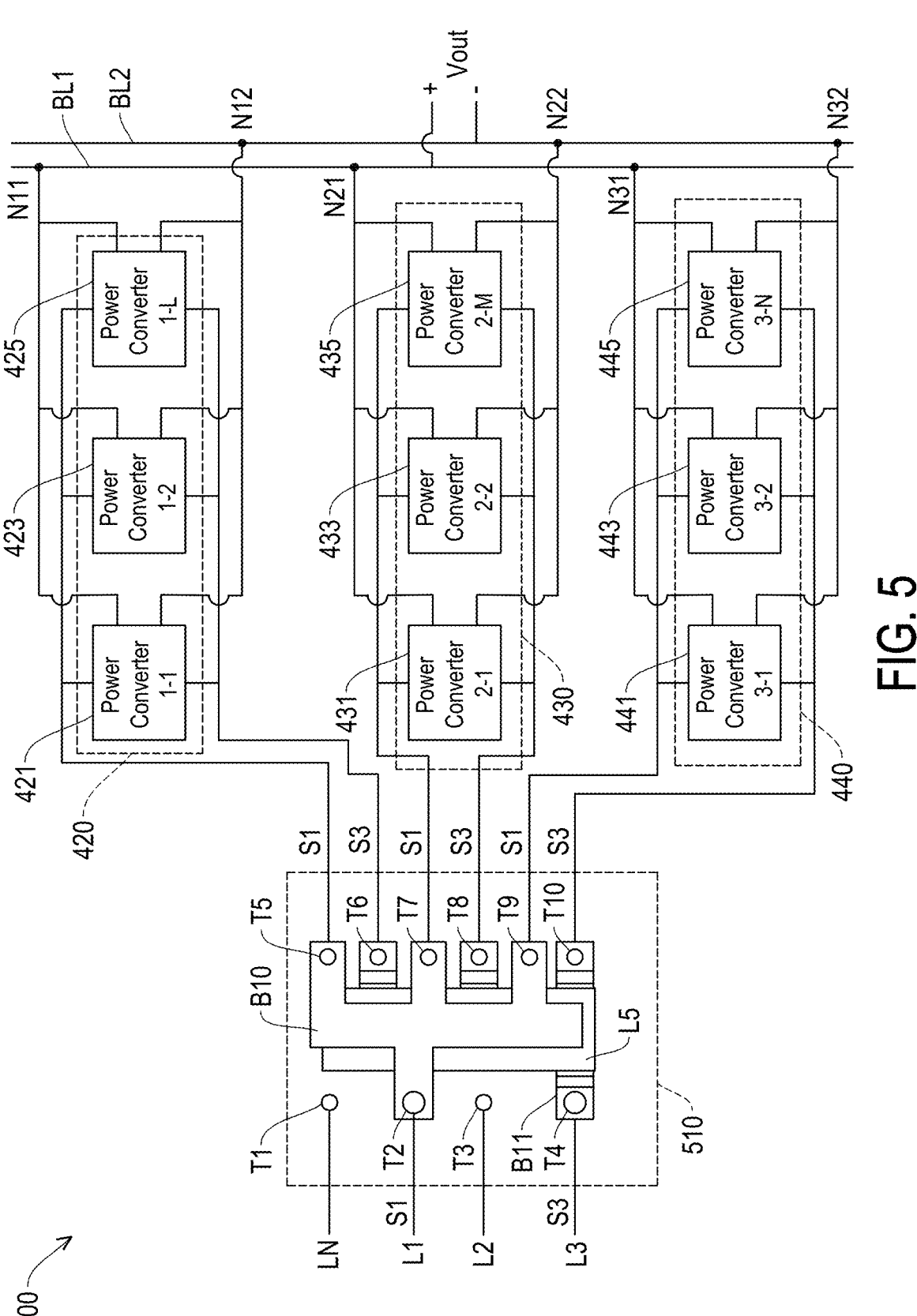
FIG. 5 is a schematic diagram of a power conversion system that supports a single-phase AC input voltage in accordance with some alternative embodiments.

FIG. 5 is a schematic diagram of a power conversion system 500 that supports a single-phase AC input voltage in accordance with some embodiments. The power conversion system 500 may receive a single-phase AC voltage as an input voltage and may output a DC voltage Vout as an output voltage. The single-phase AC voltage may be formed by the first phase signal S1 being supplied from a phase line L1 and the third phase signal S3 being supplied from a phase line L3.

The power conversion system 500 may include a connection circuitry 510 and a plurality of power conversion groups 420, 430 and 440. The power conversion groups 420, 430 and 440 of the power conversion system 500 in FIG. 5 are essentially same as the power conversion groups 420, 430 and 440 of the power conversion system 400 in FIG. 4, and the terminals T1 to T10 of the connection circuitry 510 in FIG. 5 are essentially same as the terminals T1 to T10 of the connection circuitry 410 in FIG. 4. Thus, detailed description of the power conversion groups 420, 430 and 440 and the terminals T1 to T10 of the power conversion system 500 are omitted hereafter.

The connection circuitry 510 may comprise a fourth busbar set that includes an insulating layer L5, and busbars B10 and B11. The insulating layer L5 is made of insulating material that does not conduct electricity. The busbars B10 and B11 are made of conductive material (i.e., metals) and are disposed on the insulating layer L5. The disclosure does not intend to limit the material of the insulating layer L5, the material of the busbars B10 and B11, and an arrangement of the insulating layer L5 and the busbars B10 and B11.

The busbar B10 is configured to electrically connect the second terminal T2 of the connection circuitry 510 to the fifth terminal T5, the seventh terminal T7 and the ninth terminal T9 of the connection circuitry 510. The busbar B11 is configured to electrically connect the fourth terminal T4 of the connection circuitry 510 to the sixth terminal T6, the eighth terminal T8 and the tenth terminal T10 of the connection circuitry 510. The first phase signal S1 is supplied to the fifth terminal T5, the seventh terminal T7 and the ninth terminal T9 of the connection circuitry 510 via the busbar B10. The third phase signal S3 is supplied to the sixth terminal T6, the eighth terminal T8 and the tenth terminal T10 of the connection circuitry 510 via the busbar B11. The first terminal T1 and the third terminal T3 of the connection circuitry 510 are not electrically connected to any of the terminals T6 to T10 of the connection circuitry 510. Furthermore, the first terminal T1 and the third terminal T3 of the connection circuitry 510 are not supplied with any voltage.

Each of the power converters 421, 423 and 425 of the power conversion group 420 may receive a voltage which is a potential difference between the first phase signal S1 at the fifth terminal T5 and the third phase signal S3 at the sixth terminal T6 of the connection circuitry 510. The power converters 421, 423 and 425 may convert the received voltage to generate an output voltage and provide the generated output voltage to the buses BL1 and BL2 via connection nodes N11 and N12. Each of the power converters 431, 433 and 435 of the power conversion group 430 may receive a voltage which is a potential difference between the first phase signal S1 at the seventh terminal T7 and the third phase signal S3 at the eighth terminal T8 of the connection circuitry 510. The power converters 431, 433 and 435 may convert the received voltage to generate an output voltage, and provide the generated output voltage to the buses BL1 and BL2 via connection nodes N21 and N22. Each of the power converters 441, 443 and 445 of the power conversion group 440 may receive a voltage which is a potential difference between the first phase signal S1 at the ninth terminal T9 and the third phase signal S3 at the tenth terminal T10 of the connection circuitry 510. The power converters 141, 143 and 145 may convert the received voltage to generate an output voltage, and provide the generated output voltage to the buses BL1 and BL2 via connection nodes N31 and N32. In some embodiments, the power converters in the power conversion groups 420, 430 and 440 are AC-to-DC converters. In this way, the power conversion system 500 may support the single-phase AC input voltage.

In summary, a power conversion system including a connection circuitry and a plurality of power conversion groups is introduced. The connection circuitry may include a plurality of input terminals, a plurality of output terminal, and busbar set that may selectively connect the input terminals to the output terminals. The busbar set may include a plurality of busbars that are replaceable to support various types of input voltage (i.e. three-phase AC input voltage, single-phase AC input voltage, DC input voltage). In this way, the power conversion system may be applicable for a wide range of applications. Furthermore, the power conversion system may be re-configured easily depending on the type of the input voltage by simply replacing the busbar set corresponding to type of the input voltage in the application.

Although the embodiment of the disclosure has been described in detail, the disclosure is not limited to a specific embodiment and various modifications and changes are possible within the scope of the disclosure disclosed in the claims.

What is claimed is:
1. A power conversion system, comprising:
a connection circuitry, comprising:
a plurality of input terminals, receiving an input voltage;
a plurality of output terminals, outputting a plurality of voltages; and
a busbar set, selectively connecting the plurality of input terminals to the plurality of output terminals, wherein the busbar set is replaceable, and the busbar set is selected according to a type of the input voltage; and a plurality of power conversion groups, connecting to the plurality of output terminals, configured to convert the voltages at the plurality of output terminals to generate an output voltage, wherein each power conversion group comprises a plurality of power converters connected in parallel, wherein the connection circuitry comprises first to tenth terminals, the plurality of input terminals comprises the first to fourth terminals of the connection circuitry, and the plurality of output terminals comprises the fifth to tenth terminals of the connection circuitry.

2. The power conversion system of claim 1, wherein the input voltage is a three-phase voltage, a single-phase alternating-current (AC) voltage, or a direct-current (DC) voltage.

3. The power conversion system of claim 1, wherein the plurality of power conversion groups comprises a first power conversion group, a second power conversion group and a third power conversion group, the fifth terminal and the sixth terminal of the connection circuitry are electrically connected to the first power conversion group, the seventh terminal and the eighth terminal of the connection circuitry are electrically connected to the second power conversion group, and the ninth terminal and the tenth terminal of the connection circuitry are electrically connected to the third power conversion group.

4. The power conversion system of claim 1, wherein the busbar set is a first busbar set comprising:

an insulating layer of insulating material, a first busbar, disposed on the insulating layer, electrically connecting the first terminal of the connection circuitry to the fifth terminal, the seventh terminal and the ninth terminal of the connection circuitry;

a second busbar, disposed on the insulating layer, electrically connecting the second terminal of the connection circuitry to the sixth terminal of the connection circuitry;

a third busbar, disposed on the insulating layer, electrically connecting the third terminal of the connection circuitry to the eighth terminal of the connection circuitry; and a fourth busbar, disposed on the insulating layer, electrically connecting the fourth terminal of the connection circuitry to the tenth terminal of the connection circuitry.

5. The power conversion system of claim 4, wherein the input voltage comprises a first phase signal, a second phase signal, a third phase signal and a neutral signal, the first terminal of the connection circuitry receives the neutral phase signal, the second terminal of the connection circuitry receives the first phase signal, the third terminal of the connection circuitry receives the second phase signal, and the fourth terminal of the connection circuitry receives the third phase signal.

6. The power conversion system of claim 4, wherein the plurality of power converters in each power conversion group are AC-to-DC converters.

7. The power conversion system of claim 1, wherein the busbar set is a second busbar set comprising:

an insulating layer of insulating material;

a fifth busbar, disposed on the insulating layer, electrically connecting the second terminal of the connection circuitry to the fifth terminal and the seventh terminal of the connection circuitry;

a sixth busbar, disposed on the insulating layer, electrically connecting the third terminal of the connection circuitry to the sixth terminal and the ninth terminal of the connection circuitry; and a seventh busbar, disposed on the insulating layer, electrically connecting the fourth terminal of the connection circuitry to the eighth terminal and the tenth terminal of the connection circuitry.

8. The power conversion system of claim 7, wherein the input voltage is a three-phase voltage comprising a first phase signal, a second phase signal and a third phase signal, the second terminal of the connection circuitry receives the first phase signal, the third terminal of the connection circuitry receives the second phase signal, and the fourth terminal of the connection circuitry receives the third phase signal.

9. The power conversion system of claim 7, wherein the plurality of power converters in each power conversion group are AC-to-DC converters.

10. The power conversion system of claim 1, wherein the busbar set is a third busbar set comprising:

an insulating layer of insulating material;

an eighth busbar, disposed on the insulating layer, electrically connecting the first terminal of the connection circuitry to the fifth terminal, the seventh terminal, and the ninth terminal of the connection circuitry; and a ninth busbar, disposed on the insulating layer, electrically connecting the fourth terminal of the connection circuitry to the sixth terminal, the eighth terminal and the tenth terminal of the connection circuitry.

11. The power conversion system of claim 10, wherein the first terminal and the fourth terminal of the connection circuitry receive a DC supply voltage.

12. The power conversion system of claim 10, wherein the plurality of power converters in each power conversion group are DC-to-DC converters.

13. The power conversion system of claim 10, wherein the input voltage is a single-phase alternating-current (AC) voltage comprising a phase signal and a neutral signal, the first terminal of the connection circuitry receives the neutral signal of the single-phase AC voltage, and the fourth terminal of the connection circuitry receives the phase signal of the single-phase voltage.

14. The power conversion system of claim 10, wherein the plurality of power converters in each power conversion group are AC-to-DC converters.

15. The power conversion system of claim 1, wherein the busbar set is a fourth busbar set comprising:

an insulating layer of insulating material;

a tenth busbar, disposed on the insulating layer, electrically connecting the second terminal of the connection circuitry to the fifth terminal, the seventh terminal, and the ninth terminal of the connection circuitry; and an eleventh busbar, disposed on the insulating layer, electrically connecting the fourth terminal of the connection circuitry to the sixth terminal, the eighth terminal and the tenth terminal of the connection circuitry.

16. The power conversion system of claim 15, wherein the input voltage is a three-phase voltage comprising a
 first phase signal, a second phase signal, a third phase
 signal and a neutral signal,
the second terminal of the connection circuitry receives
 the first phase signal of the three-phase voltage, and
 the fourth terminal of the connection circuitry receives
  the third phase signal of the three-phase voltage.

17. The power conversion system of claim 16, wherein the plurality of power converters in each power conver-
 sion group are AC-to-DC converters.

* * * * *